US009242205B2

(12) United States Patent
Yoon et al.

(10) Patent No.: US 9,242,205 B2
(45) Date of Patent: Jan. 26, 2016

(54) ALKALI-CARBONATE-BASED CARBON DIOXIDE ABSORBENT CONTAINING ADDED STERICALLY HINDERED CYCLIC AMINES, AND METHOD FOR REMOVING CARBON DIOXIDE REMOVING USING SAME

(75) Inventors: Yeo-Il Yoon, Daejeon (KR); Sung-Chan Nam, Daejeon (KR); Young-Eun Kim, Daejeon (KR); Il-Hyun Baek, Daejeon (KR); Sang-Do Park, Daejeon (KR)

(73) Assignee: KOREA INSTITUTE OF ENERGY RESEARCH (KR)

( * ) Notice: Subject to any disclaimer, the term of this patent is extended or adjusted under 35 U.S.C. 154(b) by 784 days.

(21) Appl. No.: 13/519,514

(22) PCT Filed: Dec. 29, 2009

(86) PCT No.: PCT/KR2009/007893
§ 371 (c)(1),
(2), (4) Date: Aug. 9, 2012

(87) PCT Pub. No.: WO2011/081228
PCT Pub. Date: Jul. 7, 2011

(65) Prior Publication Data
US 2012/0308457 A1     Dec. 6, 2012

(30) Foreign Application Priority Data
Dec. 28, 2009  (KR) .................. 10-2009-0131571

(51) Int. Cl.
*B01D 53/62* (2006.01)
*B01D 53/14* (2006.01)
(Continued)

(52) U.S. Cl.
CPC ........ *B01D 53/1475* (2013.01); *B01D 53/1493* (2013.01); *B01D 53/62* (2013.01);
(Continued)

(58) Field of Classification Search
CPC ............... B01D 53/1475; B01D 53/62; B01D 53/1493; B01D 2257/504; B01D 2251/306; B01D 2251/606; B01D 2252/20426; B01D 2252/20431; B01D 2252/2041; B01D 2252/20436; B01D 2252/20442; B01D 2252/20447; B01D 2252/504; B01D 2252/60; B01D 2252/602; B01D 2252/604; B01D 2252/606; B01D 2252/608; B01D 2252/61; Y02C 10/04; Y02C 10/06
See application file for complete search history.

(56) References Cited

U.S. PATENT DOCUMENTS

| 4,112,050 A | 9/1978 | Sartori et al. |
| 4,183,903 A | 1/1980 | Melchior et al. |

(Continued)

FOREIGN PATENT DOCUMENTS

| CA | 1098506 | 3/1981 |
| CA | 2336043 | 5/2009 |

(Continued)

OTHER PUBLICATIONS

International Search Report mailed Jan. 25, 2011 for International Patent Application No. PCT/KR2009/007893.
(Continued)

*Primary Examiner* — Stuart Hendrickson
*Assistant Examiner* — Daniel Berns
(74) *Attorney, Agent, or Firm* — Swanson & Bratschun, L.L.C.

(57) ABSTRACT

The present invention relates to a carbon dioxide absorbent, and more particularly, to an alkali carbonate-based carbon dioxide absorbent containing added sterically hindered cyclic amines, and to a method for removing carbon dioxide using same. By adding sterically hindered cyclic amines to an alkali carbonate material, the rate of carbon dioxide absorption is increased, renewable energy is reduced, and salt production and phase separation do not occur.

5 Claims, 5 Drawing Sheets

(51) Int. Cl.
   *B01D 53/78* (2006.01)
   *B01D 53/96* (2006.01)
(52) U.S. Cl.
   CPC ..... *B01D2251/306* (2013.01); *B01D 2251/606* (2013.01); *B01D 2252/2041* (2013.01); *B01D 2252/20426* (2013.01); *B01D 2252/20447* (2013.01); *B01D 2252/504* (2013.01); *B01D 2257/504* (2013.01); *Y02C 10/04* (2013.01); *Y02C 10/06* (2013.01)

(56) References Cited

U.S. PATENT DOCUMENTS

| | | |
|---|---|---|
| 4,217,238 A | 8/1980 | Sartori et al. |
| 4,405,579 A | 9/1983 | Sartori et al. |
| 4,581,209 A | 4/1986 | Oswald et al. |

FOREIGN PATENT DOCUMENTS

| | | |
|---|---|---|
| CN | 1780677 | 5/2006 |
| KR | 10-0920116 | 10/2009 |

OTHER PUBLICATIONS

Australian First Office Action for Application No. 2009357630 dated Mar. 13, 2013.
Australian Second Office Action for Application No. 2009357630 dated Apr. 8, 2014.
Canadian First Office Action for Application No. 2,785,862 dated Aug. 19, 2013.
Canadian Second Office Action for Application No. 2,785,862 dated May 27, 2014.
European Search Report for Application No. 09852830.0 dated Nov. 28, 2013.

ALKALI-CARBONATE-BASED CARBON DIOXIDE ABSORBENT CONTAINING ADDED STERICALLY HINDERED CYCLIC AMINES, AND METHOD FOR REMOVING CARBON DIOXIDE REMOVING USING SAME

CROSS-REFERENCE TO RELATED APPLICATION

This application is a 35 U.S.C. §371 national phase application of PCT/KR2009/007893 (WO 2011/081228), filed on Dec. 29, 2009, entitled "ALKALI-CARBONATE-BASED CARBON DIOXIDE ABSORBENT CONTAINING ADDED STERICALLY HINDERED CYCLIC AMINES, AND METHOD FOR REMOVING CARBON DIOXIDE REMOVING USING SAME", which application claims priority to and the benefit of Korean Patent Application No. 2009-0131571, filed on Dec. 28, 2009, the disclosure of which is incorporated herein by reference in its entirety.

BACKGROUND

1. Field of the Invention

The present invention relates to a carbon dioxide absorbent, and more particularly, to an alkali carbonate-based carbon dioxide absorbent containing an added sterically hindered cyclic amine that may improve a rate of carbon dioxide absorption, reduce an amount of renewable energy used, and prevent salt production and phase separation, and a method for removing carbon dioxide using the same.

2. Discussion of Related Art

Carbon dioxide, one of six greenhouse gases which contribute to global warming, is an acidic gas that is emitted in large quantities by a plethora of stationary sources. To separate and remove carbon dioxide emissions that may be attributed to energy industries, many studies have been conducted on economically efficient processes for absorbing carbon dioxide through use of an aqueous absorbent.

The most widely used absorption process includes using an aqueous absorbent alkanolamine process (for example, monoethanolamine, diethanolamine, triethanolamine, and the like) and the Benfield process using potassium carbonate may be mentioned.

The alkanolamine process uses 20 to 30 wt % of a solution comprising water and various alkanolamines used to absorb carbon dioxide, and because of rapid carbon dioxide absorption, has been in commercial use since the nineteen seventies.

However, this process has issues of using an excessively high amount of energy in a range of 4.0 to 4.2 GJ/ton $CO_2$, (in the case of, for example, monoethanolamine (MEA)) during regeneration, and corrosion of components made from carbon steel by oxidation reactions of pollutants present in combustion exhaust, such as, for example, $O_2$, $SO_2$, and $NO_x$, and the like.

The most pressing issue of all is high renewable heat. In order to solve this issue, absorbents having steric hindrance have been developed in which steric hindrance occurs by attaching a methyl or ethyl group to a nitrogen atom in an alkanolamine used to remove carbon dioxide via carbamate bonds in order to reduce the bond strength. A representative example is 2-amino-2-methyl-1-propanol (AMP).

This absorbent absorbs carbon dioxide less rapidly than MEA, but has an advantage of using a considerably low amount of renewable energy. Similarly, an absorbent KS-1™ of Mitsubishi Heavy Industries, Ltd. known for using a sterically hindered amine as a major constituent exhibits usage of a very low amount of renewable energy in a range of 2.8 to 3.2 GJ/ton $CO_2$. However, the sterically hindered amine used is mostly alkanolamines, in particular, primary amines with sterically hindering groups.

Advanced carbon capture technologies using sterically hindered amines have been suggested. For example, Japanese Patent Application No. 1994-242915 (registered as Japanese Patent No. 3197173, Jun. 8, 2001) of Kansai Electric Power Co., Inc. and Mitsubishi Heavy Industries, Ltd. discloses a method for removing carbon dioxide in combustion exhaust. This art teaches a compound represented by the following chemical formula as a major constituent of an absorbent to improve the $CO_2$, absorption capacity per unit mole and per unit volume of the absorbent, increase the absorption rate, and reduce an amount of renewable energy used. In the following chemical formula, R1 is a lower alkyl group and R2 is hydrogen or a lower alkyl group. Also, this art claims a system containing a sterically resistant piperazine derivative in an aqueous solution wherein the concentration of the piperazine derivative in the aqueous solution is 15 to 65 wt %.

However, when the concentration is 20 or more wt %, an additional material, such as, for example, an alcohol, is required to solubilize the piperazine derivative. Also, this system is merely a binary system in which two constituents, that is, water and the piperazine derivative are simply mixed. Due to an absence of alkali carbonate that tends to promote formation of bicarbonate, this art is unfavorable in that a bicarbonate forming reaction is not dominant over a carbamate forming reaction during CO/absorption reaction.

To capture carbon dioxide that is an acidic gas, processes using liquid-type alkalis, such as, for example, NaOH, $Na_2CO_3$, $K_2CO_3$, KOH, and the like exist. In this instance, the Benfield process and the Catacarb process may be mentioned as representative examples. The Benfield process adds alkanolamines, such as, for example, mainly diethanolamine (DEA) to improve the reaction rate. The Catacarb process uses potassium carbonate as a major constituent and unknown organics or inorganics as a promoter to improve the reaction rate.

However, because these processes must operate an absorber and a stripper at 120° C. or more under the inlet gas pressure of 10 atmospheres (atm) or more to prevent the production of a salt of potassium bicarbonate, they have a drawback of using a large amount of energy.

Recently, an improved process using potassium carbonate was published in WO 2004/089512 A1 by Dr. Rochelle et al, The University of Texas.

According to this art, an absorbent contains potassium carbonate and piperazine or a piperazine derivative. Here, the piperazine or piperazine derivative serves to improve the absorption rate. Since piperazine is an alkylamine of a cyclic diamine structure and has two amino groups, the absorbent containing potassium carbonate and piperazine can efficiently absorb carbon dioxide and reduce the amount of renewable energy used.

However, it is predicted that this absorbent will have a problem in solubility. Afterwards, Korean Patent Application No. 2005-7018813 discloses the use of piperazine to prevent the salt production and improve the absorption rate, however piperazine is not sterically hindered.

As described in the foregoing, conventional arts using potassium carbonate, as a benefit of potassium carbonate, efficiently use a low amount of renewable energy, and to overcome the drawbacks of low absorption rate and salt production that are caused by the use of potassium carbonate, use a non-sterically hindered piperazine derivative as an additive. However, a verification experiment conducted using the corresponding conditions reveals that a salt is produced and chemical phase separation frequently occurs under certain conditions.

SUMMARY OF THE INVENTION

An aspect of the present invention provides an alkali carbonate-based carbon dioxide absorbent containing an added sterically hindered cyclic amine to improve the rate of carbon dioxide absorption, reduce an amount of renewable energy used, and prevent the salt production and phase separation.

Another aspect of the present invention provides a method for removing carbon dioxide including contacting gas containing carbon dioxide with an alkali carbonate-based carbon dioxide absorbent containing an added sterically hindered cyclic amine to absorb carbon dioxide and regenerating the carbon dioxide absorbent, thereby efficiently removing carbon dioxide from the gas containing carbon dioxide.

According to an aspect of the present invention, there is provided an alkali carbonate-based carbon dioxide absorbent containing an added sterically hindered cyclic amine, including 16 or less wt % of an alkali carbonate and 10 or less wt % of a sterically hindered cyclic amine.

According to another aspect of the present invention, there is provided a method for removing carbon dioxide including contacting gas containing carbon dioxide with an alkali carbonate-based carbon dioxide absorbent containing an added sterically hindered cyclic amine, absorbing carbon dioxide from the gas, and regenerating the carbon dioxide absorbent.

DETAILED DESCRIPTION OF EXEMPLARY EMBODIMENTS

Hereinafter, the present invention is described in more detail with reference to the accompanying drawings.

The present invention provides an alkali carbonate-based carbon dioxide absorbent containing an added sterically hindered cyclic amine to improve the rate of carbon dioxide absorption, reduce the amount of renewable energy used, and prevent the salt production and chemical phase separation.

The alkali carbonate-based carbon dioxide absorbent containing an added sterically hindered cyclic amine according to the present invention includes 16 or less wt % of an alkali carbonate and 10 or less wt % of a sterically hindered cyclic amine.

In 16 or less wt % of the alkali carbonate used as a major constituent of the carbon dioxide absorbent according to the present invention, the alkali is limited to sodium and potassium that are metallic elements of Group 11, and the carbonate is a mixture of bicarbonate and carbonate.

Preferably, the alkali carbonate used in the carbon dioxide absorbent according to the present invention is at least one selected from potassium carbonate ($K_2CO_3$), sodium carbonate ($Na_2CO_3$), sodium hydroxide (NaOH), potassium hydroxide (KOH), potassium bicarbonate ($KHCO_3$), and sodium bicarbonate ($NaHCO_3$).

The sterically hindered cyclic amine used as an additive of the carbon dioxide absorbent according to the present invention includes various compounds with an alkyl group attached to a nitrogen atom that directly reacts with carbon dioxide to provide steric effects.

Generally, when a nitrogen atom of an amine reacts with carbon dioxide, carbon dioxide is absorbed in the form of carbamate. However, according to the present invention, since the sterically hindered cyclic amine additive added to the aqueous potassium carbonate solution is a secondary amine with steric hindrance, carbon dioxide is mainly absorbed in the form of bicarbonate rather than in the form of carbamate.

In particular, when a mixture of the alkali carbonate and the additive reacts with carbon dioxide, a portion of the additive absorbs carbon dioxide in the form of carbamate as shown in Formula (1) below.

Subsequently, molecules of the additive used in absorbing carbon dioxide in the form bicarbonate by the Coulombic force in the presence of alkali cations of the alkali carbonate as shown in Formula (2) below. Accordingly, the present invention can greatly reduce the amount of renewable energy used, unlike the conventional arts.

When the sterically hindered cyclic amine alone is present, Formula (2) does not proceed and thus the amount of renewable energy used is reduced by a small margin. However, when the sterically hindered cyclic amine is present together with the alkali carbonate, Formula (2) proceeds and thus the amount of renewable energy used is greatly reduced.

$$2R\text{—}NH_2 \text{ (amine)} + CO_2 \Leftrightarrow [R\text{—}NH\text{—}CO_2^-][R\text{—}NH_3^+] \quad \text{Formula (1)}$$

$$[R\text{—}NH\text{—}CO_2^-][R\text{—}NH_3^+] + H_2O + M^+ \Leftrightarrow [R\text{—}NH_3^+][HCO_3^+] + R\text{—}NH_2 + M^+ \quad \text{Formula (2)}$$

As described in the foregoing, the sterically hindered cyclic amine used in the carbon dioxide absorbent according to the present invention is a secondary amine having two carbons bonded to a nitrogen atom. Generally, higher amines have a smaller number of hydrogen atoms bonded to a nitrogen atom, to necessitate formation of bicarbonate. In the absorption reaction of carbon dioxide, carbamate rather than bicarbonate tends to form, which reduces the consumption of renewable energy but lowers the $CO_2$ absorption reaction rate.

When compared to piperazine in the absorbent suggested by Dr. Rochelle et al., the sterically hindered cyclic amine forms a greater amount of bicarbonate due to the presence of a sterically hindering group adjacent to a nitrogen atom. Even though carbamate is formed, the carbamate turns into bicarbonate in the presence of alkali cations of the alkali carbonate. Also, a small amount of heat of absorption reaction is emitted.

Here, a small amount of heat of absorption reaction means a low amount of energy being used in the subsequent regeneration reaction.

The sterically hindered cyclic amine used in the present invention has a boiling point above the temperature of 110 to 120° C., in which carbamate or bicarbonate is stripped and regenerated, at the pressure of 1 atmosphere (atm), to reduce the evaporation loss that takes places in amine absorbents. Also, the sterically hindered cyclic amine used in the present invention has 500 grams (g) or more of solubility per 1 liter (L) of water at 25° C.

Preferably, the sterically hindered cyclic amine used as an additive of the carbon dioxide absorbent according to the present invention is at least one selected from 1-amino-4-methyl piperazine, 1-(2-aminoethyl)-4-methyl piperazine, 1-(2-hydroxyethyl)-4-methyl piperazine, 1-(2-aminoethyl)-piperazine, 1-(2-hydroxyethyl)-piperazine, 2-aminoethyl-piperazine, 1-ethyl-piperazine, 2,5-dimethyl-piperazine, c is 2,6-dimethyl-piperazine, 1,4-dimethyl-piperazine, trans 2,5-dimethyl-piperazine, 1-methyl piperazine, 2-methyl piperazine, 1-ethyl piperazine, 2-piperidine ethanol, 3-piperidine ethanol, 4-piperidine ethanol, 2-aminoethyl-1-piperidine, and homopiperazine.

Among the exemplary alkali carbonates above, potassium carbonate has a limited solubility. When only potassium carbonate is used, potassium bicarbonate precipitates, which results in a very low rate of carbon dioxide removal. Accordingly, when potassium carbonate as the alkali carbonate is used with the aqueous solution of sterically hindered cyclic amine at 80° C. or less, the concentration of potassium carbonate is preferably limited to 16 or less wt %. When the concentration exceeds 16 wt %, a salt may be produced.

The sterically hindered cyclic amine used as an additive in the present invention absorbs carbon dioxide in the mixed form of carbamate and bicarbonate. Accordingly, the concentration of the sterically hindered cyclic amine is preferably limited to 10 or less wt %. Like potassium carbonate, when the concentration exceeds 10 wt %, a salt may be produced.

Figure 1:
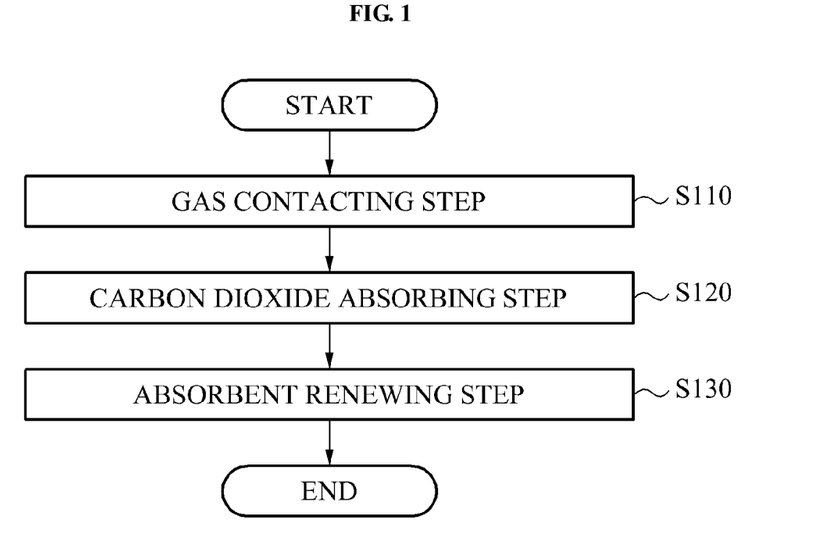
FIG. 1 is a flowchart illustrating a method for removing carbon dioxide according to the present invention.

FIG. 1 is a flowchart illustrating a method for removing carbon dioxide according to the present invention.

As shown in FIG. 1, the method for removing carbon dioxide according to the present invention includes a gas contacting step (operation S110), a carbon dioxide absorbing step (operation S120), and an absorbent regenerating step (operation S130).

In the gas contacting step (operation S110), the alkali carbonate-based carbon dioxide absorbent containing an added sterically hindered cyclic amine is contacted with gas containing carbon dioxide. In this instance, as described in the foregoing, the carbon dioxide absorbent includes 16 or less wt % of an alkali carbonate and 10 or less wt % of a sterically hindered cyclic amine. The carbon dioxide absorbent may further include a corrosion inhibitor, a flocculation aid, an antioxidant, an antifoaming agent, or mixtures thereof.

As the alkali carbonate, it is preferable to use at least one selected from potassium carbonate ($K_2CO_3$), sodium carbonate ($Na_2CO_3$), sodium hydroxide (NaOH), potassium hydroxide (KOH), potassium bicarbonate ($KHCO_3$), and sodium bicarbonate ($NaHCO_3$).

Preferably, the sterically hindered cyclic amine is at least one selected from 1-amino-4-methyl piperazine, 1-(2-aminoethyl)-4-methyl piperazine, 1-(2-hydroxyethyl)-4-methyl piperazine, 1-(2-aminoethyl)-piperazine, 1-(2-hydroxyethyl)-piperazine, 2-aminoethyl-piperazine, 1-ethyl-piperazine, 2,5-dimethyl-piperazine, c is 2,6-dimethyl-piperazine, 1,4-dimethyl-piperazine, trans 2,5-dimethyl-piperazine, 1-methyl piperazine, 2-methyl piperazine, 1-ethyl piperazine, 2-piperidine ethanol, 3-piperidine ethanol, 4-piperidine ethanol, 2-aminoethyl-1-piperidine, and homopiperazine.

In the carbon dioxide absorbing step (operation S120), carbon dioxide is absorbed from the gas containing carbon dioxide. In this instance, the carbon dioxide absorbing step (operation S120) is preferably performed in the temperature range between 20 to 90° C. at 1 to 30 atm.

In the absorbent regenerating step (operation S130), the absorbent used in absorbing carbon dioxide from the gas containing carbon dioxide is regenerated. In this instance, the absorbent regenerating step (operation S130) is preferably performed in the temperature range between 105 to 120° C. at 1 to 10 atm.

Figure 2:
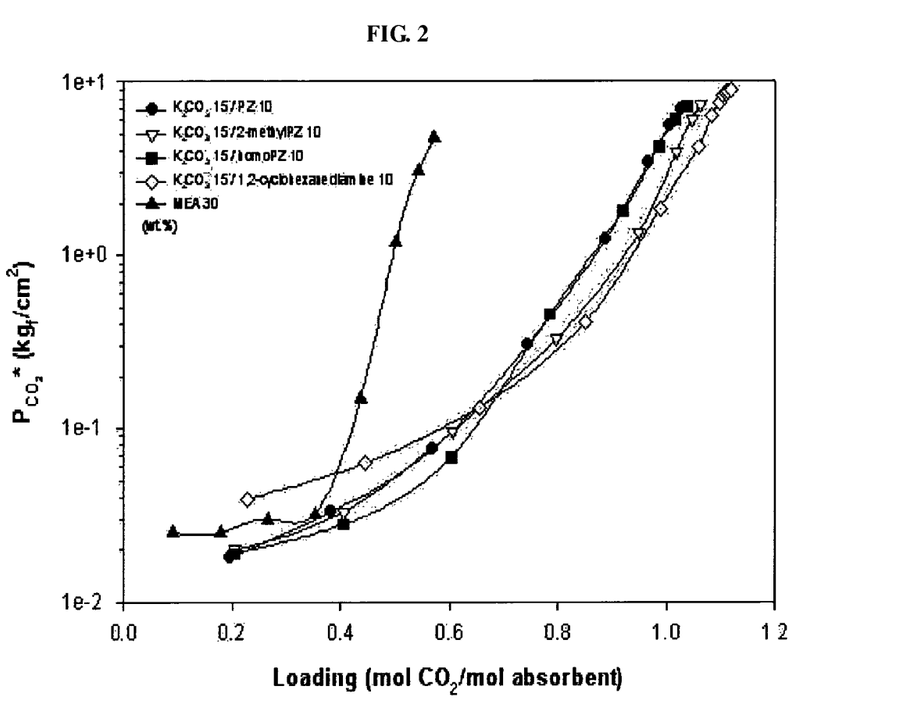
FIG. 2 is a vapor/liquid equilibrium diagram of a carbon dioxide absorbent according to the present invention.

FIG. 2 is a vapor/liquid equilibrium diagram of the carbon dioxide/absorbent measured using a shell reactor.

Referring to FIG. 2, it is seen that the alkali carbonate-based carbon dioxide absorbent containing an added sterically hindered cyclic amine according to the present invention is positioned under a commercial absorbent, MEA 30 wt %. This indicates that the carbon dioxide absorbent of the present invention absorbs a larger amount of carbon dioxide.

Figure 3:
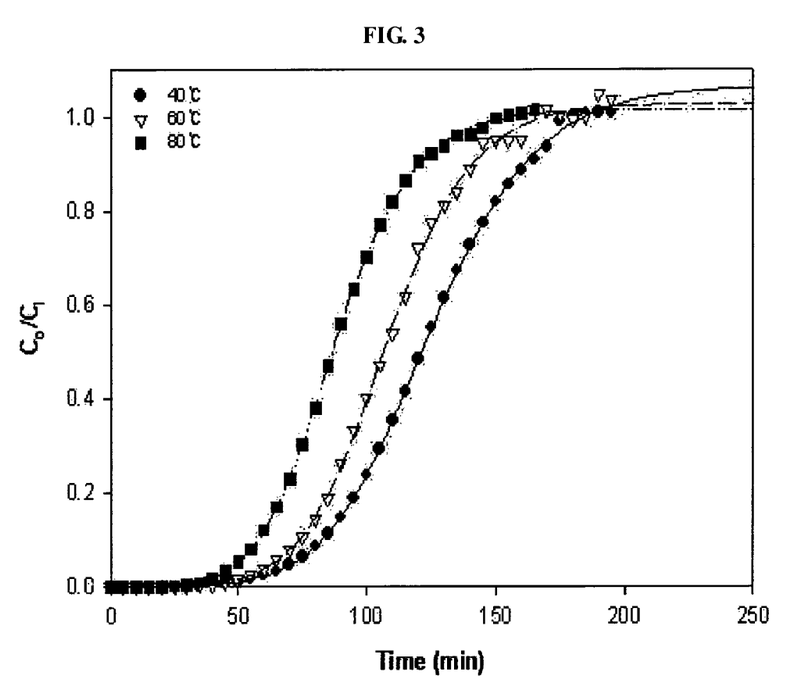
FIG. 3 is a graph illustrating an experimental breakthrough curve of a carbon dioxide absorbent (15 wt % of a potassium carbonate/10 wt % of an additive) at temperatures according to the present invention.

FIG. 3 is a diagram illustrating the absorption capacity of the carbon dioxide absorbent measured in a continuous stirred tank reactor (CSTR) at the exhaust gas standard temperature of 40 to 60° C.

The concentration of gas released, not absorbed, in the injected gas (30% $CO_2$ + 70% $N_2$) is measured using gas chromatography (GC). When saturated, the concentration is defined as one when a difference in average concentration is 0.01% during 10 minutes. The specific results are shown in Table 1 below. Referring to Table 1, it is found that the carbon dioxide absorbent containing an added sterically hindered cyclic amine according to the present invention has a generally high capacity (mol $CO_2$/mol absorbent).

TABLE 1

| Concentration (wt. %) | Temp. (° C.) | $t_S$ (min) | $t_E$ (min) | Capacity (mol $CO_2$/ mol absorbent) |
|---|---|---|---|---|
| $K_2CO_3$ 15/PZ 10 | 40 | 100 | 180 | 0.828 |
| | 60 | 88 | 160 | 0.742 |
| | 80 | 72 | 149 | 0.641 |
| $K_2CO_3$ 15/2-methylPZ 10 | 40 | 82 | 185 | 0.864 |
| | 60 | 74 | 171 | 0.761 |
| | 80 | 58 | 157 | 0.627 |
| $K_2CO_3$ 15/ homoPZ 10 | 40 | 81 | 192 | 0.786 |
| | 60 | 84 | 156 | 0.738 |
| | 80 | 75 | 139 | 0.662 |
| MEA 30 | 60 | 153 | 230 | 0.537 |
| DEA 30 | 60 | 54 | 182 | 0.478 |
| TEA 30 | 60 | 2 | 75 | 0.144 |
| AMP 30 | 60 | 64 | 266 | 0.601 |

Figure 4:
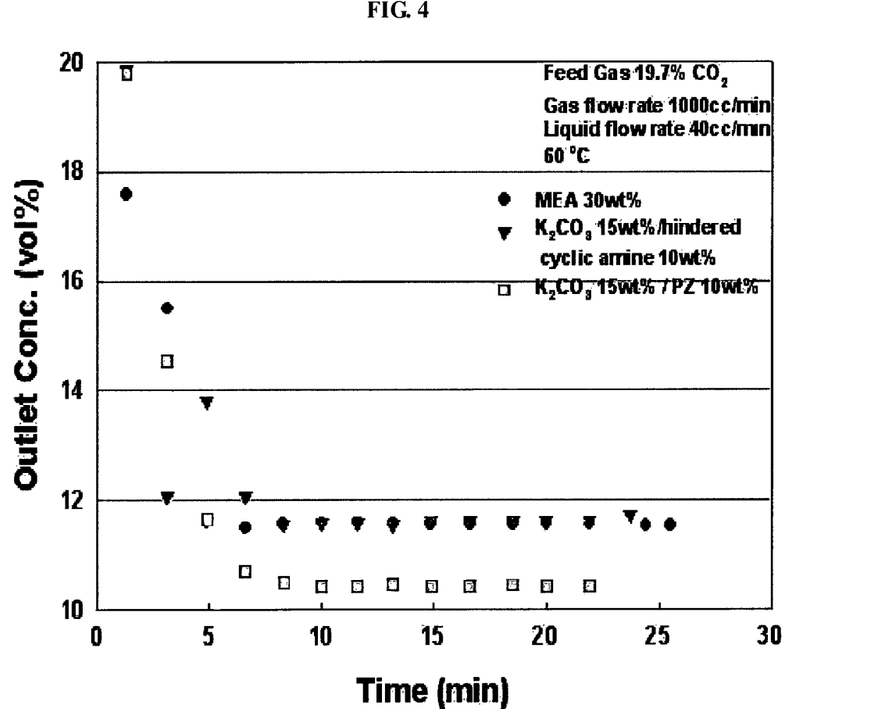
FIG. 4 is a graph illustrating the absorption rate of a carbon dioxide absorbent according to the present invention.

FIG. 4 is a diagram illustrating the absorption rate of the carbon dioxide absorbent measured using a wetted wall column at 40 to 60° C.

As shown in FIG. 4, the carbon dioxide absorbent according to the present invention has a nearly similar absorption rate at 60° C. to that of a commercial absorbent, MEA 30 wt %. Specifically, a rate constant of MEA 30 wt % is 2.92×10$^{-6}$ kmol/m$^2$-sPa-s, and a rate constant of the carbon dioxide absorbent according to the present invention is 3.02×10$^{-6}$ kmol/m$^2$-sPa-s.

Figure 5:
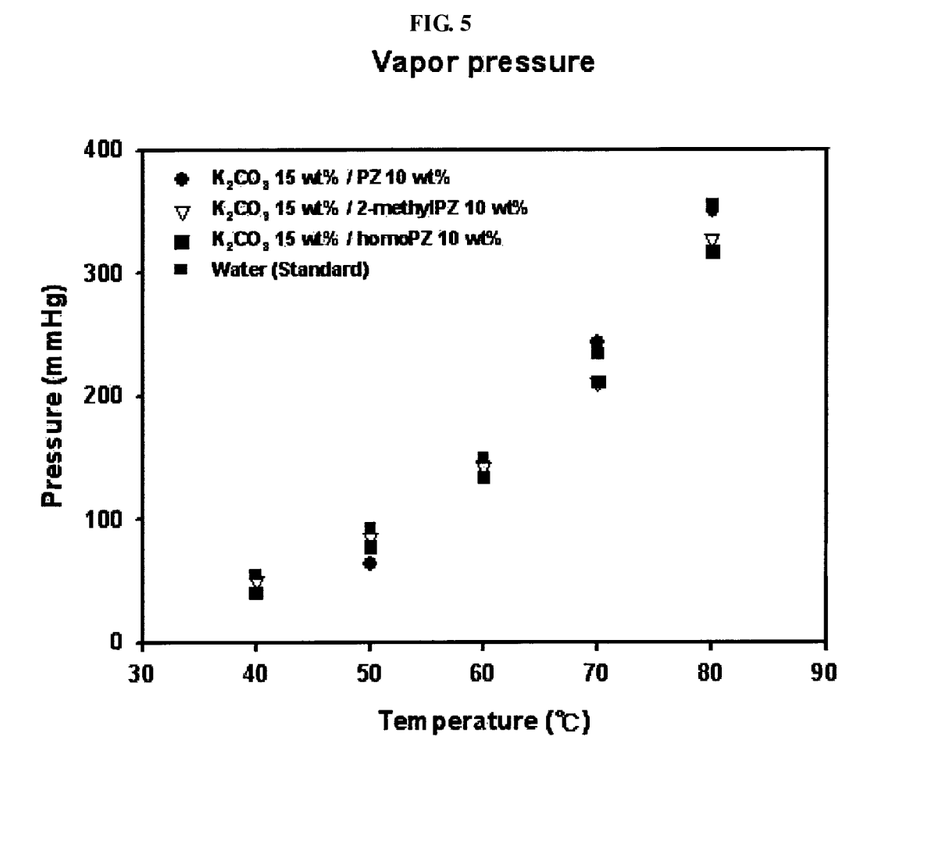
FIG. 5 is a graph illustrating the vapor pressure of a carbon dioxide absorbent according to the present invention.

FIG. 5 is a diagram illustrating the vapor pressure of the carbon dioxide absorbent according to the present invention.

It is found that the carbon dioxide absorbent according to the present invention exhibits a lower vapor pressure than water in the absorption temperature range between 40 to 80°

C., and thus has a low evaporation loss of the absorbent similar to a process using ammonia. Also, when compared to the absorbent using piperazine ($K_2CO_3+PZ$) suggested by Dr. Rochelle et al., The University of Texas, the carbon dioxide absorbent according to the present invention exhibits a lower evaporation loss, and thus has a lower evaporation loss when applied to a process.

Table 2 shows the released heat of absorption reaction measured using a Mettler Toledo reaction calorimeter for the same amount of carbon dioxide absorbents.

TABLE 2

| Absorbent | ΔH (GJ/ton CO2) |
|---|---|
| $K_2CO_3$ 15/PZ 10 | 1.45 |
| $K_2CO_3$ 15/2-methylPZ 10 | 1.36 |
| $K_2CO_3$ 15/homoPZ 10 | 1.42 |
| MEA 30 | 1.93 |
| KS 1 | 1.55 |

The renewable heat is the sum of the heat of absorption reaction, the latent heat of a solvent, and the sensible heat. In the case of a chemical absorbent, the heat of absorption reaction is at least 50% of the total renewable energy. When the heat of absorption reaction is about twice as much as the latent heat of water as a solvent, the renewable heat consists of 50% of the heat of absorption reaction, 35% of the latent heat, and 15% of the sensible heat. Accordingly, it is found that the heat of chemical reaction occupies a considerably high proportion of the renewable heat in the chemical absorbent.

In Table 2, the data of the absorbent KS-1™ is not obtained by direct measurement but is based on values presented at 9th International Conference on Greenhouse Gas Control Technologies (GHGT9) hosted by the Research Institute of Innovative Technology for the Earth (RITE). Through the measurement results, it is found that the alkali carbonate-based carbon dioxide absorbent containing an added sterically hindered cyclic amine according to the present invention exhibits the lowest heat of absorption reaction. That is, the heat of absorption reaction of the carbon dioxide absorbent according to the prevent invention is lower than that of the conventional absorbent using piperazine.

The chemical properties of each absorbent at 25° C. are shown in Table 3 below.

TABLE 3

| Absorbent | Observations |
|---|---|
| $K_2CO_3$ 15 wt. %/PZ 7.5 wt. % | 2 layer (upper: white and opaque solid, bottom: colorless and transparent liquid) |
| $K_2CO_3$ 15 wt. %/PZ 10 wt. % | 2 layer (upper: white and opaque solid, bottom: colorless and transparent liquid) |
| $K_2CO_3$ 20 wt. %/PZ 7.5 wt. % | 2 layer (upper: white and opaque solid, bottom: colorless and transparent liquid) |
| $K_2CO_3$ 20 wt. %/PZ 10 wt. % | 2 layer (upper: white and opaque solid, bottom: colorless and transparent liquid) |
| $K_2CO_3$ 15 wt. %/2-methylPZ 7.5 wt. % | yellow and transparent liquid |
| $K_2CO_3$ 15 wt. %/2-methylPZ 10 wt. % | yellow and transparent liquid |
| $K_2CO_3$ 20 wt. %/2-methylPZ 7.5 wt. % | 2 layer (upper: yellow and transparent liquid, bottom: colorless and transparent liquid) |
| $K_2CO_3$ 20 wt. %/2-methylPZ 10 wt. % | 2 layer (upper: yellow and transparent liquid, bottom: colorless and transparent liquid) |
| $K_2CO_3$ 15 wt. %/homoPZ 7.5 wt. % | yellow and transparent liquid |
| $K_2CO_3$ 15 wt. %/homoPZ 10 wt. % | yellow and transparent liquid |
| $K_2CO_3$ 20 wt. %/homoPZ 7.5 wt. % | 2 layer (upper: white and opaque solid, bottom: colorless and transparent liquid) |
| $K_2CO_3$ 20 wt. %/homoPZ 10 wt. % | 2 layer (upper: white and opaque solid, bottom: colorless and transparent liquid) |

As shown in Table 3, it is found that the conventional absorbent suggested in Korean Patent Application No. 2005-7018813 separates into two layers under some conditions but such layer separation is absent in the absorbent according to the present invention.

Table 4 shows the observations under conditions of 10 wt % of a sterically hindered cyclic amine and varying concentrations of an alkali carbonate at 25° C. When the concentration of an alkali carbonate exceeds 16 wt % based on $K_2CO_3$ 16 wt %/2 methyl PZ 10 wt %, the layer separation is observed. Also, it is seen that a ratio of an upper layer to a bottom layer gradually increases with increasing concentration of an alkali carbonate.

TABLE 4

| Absorbent (wt %) | Observations | Ratio (upper:bottom) |
|---|---|---|
| $K_2CO_3$ 13/2-methylPZ 10 | yellow and transparent liquid | |
| $K_2CO_3$ 14/2-methylPZ 10 | yellow and transparent liquid | |
| $K_2CO_3$ 15/2-methylPZ 10 | yellow and transparent liquid | |
| $K_2CO_3$ 16/2-methylPZ 10 | yellow and transparent liquid | |
| $K_2CO_3$ 17/2-methylPZ 10 | 2 layer (upper: yellow and transparent liquid, bottom: colorless and transparent liquid) | 2.5:7.0 (1:2.80) |
| $K_2CO_3$ 18/2-methylPZ 10 | 2 layer (upper: yellow and transparent liquid, bottom: colorless and transparent liquid) | 2.6:7.1 (1:2.73) |
| $K_2CO_3$ 19/2-methylPZ 10 | 2 layer (upper: yellow and transparent liquid, bottom: colorless and transparent liquid) | 2.6:6.8 (1:2.61) |
| $K_2CO_3$ 20/2-methylPZ 10 | 2 layer (upper: yellow and transparent liquid, bottom: colorless and transparent liquid) | 2.7:6.8 (1:2.:51) |

Table 5 shows the observations under conditions of 16 wt % of an alkali carbonate and increased concentrations of 10 or more wt % of a sterically hindered cyclic amine. When the concentration of a sterically hindered cyclic amine is 11 or more wt %, the layer separation is observed. Also, it is seen that a bottom layer gradually decreases with an increasing concentration of a sterically hindered cyclic amine. Accordingly, it is concluded that an optimum concentration of an alkali carbonate is 16 or less wt % and an optimum concentration of a sterically hindered cyclic amine is 10 or less wt %.

TABLE 5

| Absorbent (wt %) | Observations | Ratio (upper:bottom) |
|---|---|---|
| $K_2CO_3$ 16/2-methylPZ 8 | yellow and transprent liquid | |
| $K_2CO_3$ 16/2-methylPZ 9 | yellow and transparent liquid | |

TABLE 5-continued

| Absorbent (wt %) | Observations | Ratio (upper:bottom) |
|---|---|---|
| K$_2$CO$_3$ 16/2-methylPZ 10 | yellow and transparent liquid | |
| K$_2$CO$_3$ 16/2-methylPZ 11 | 2 layer (upper: yellow and transparent liquid, bottom: colorless and transparent liquid) | 3.4:6.3 (1:2.85) |
| K$_2$CO$_3$ 16/2-methylPZ 12 | 2 layer (upper: yellow and transparent liquid, bottom: colorless and transparent liquid) | 4:5.6 (1:1.4) |
| K$_2$CO$_3$ 16/2-methylPZ 13 | 2 layer (upper: yellow and transparent liquid, bottom: colorless and transparent liquid) | 4.2:5.1 (1:1.2) |
| K$_2$CO$_3$ 16/2-methylPZ 14 | 2 layer (upper: yellow and transparent liquid, bottom: colorless and transparent liquid) | 4.8:4.7 (1:0.98) |

The layer separation occurs due to a density difference and a Zeta potential difference. When the layer separation occurs during a process, the absorbent is precipitated at the bottom to form an unmixed area, which causes stagnation. As a result, the procedural efficiency in an absorber and a stripper is reduced. Also, when the absorbent supply is replenished to prepare for the loss of the absorbent in a continuous process, the layer separation occurs in an absorbent storage tank. Since a fresh absorbent is supplied to only an area where an absorbent feed line is located, a normal level of the procedural efficiency cannot be maintained.

The present invention can prevent the layer phase, thereby maintaining a normal level of the procedural efficiency, and can reduce the cost involved in capturing carbon dioxide due to low consumption of renewable energy and a high absorption rate.

Accordingly, when the present invention is applied to a process using a new absorbent for separating carbon dioxide from combustion exhaust gas at a low cost, it may greatly contribute to technologies for reducing greenhouse gas emissions in an effort to deal with global warming.

According to the present invention, the alkali carbonate-based carbon dioxide absorbent containing an added sterically hindered cyclic amine may reduce the cost involved in capturing carbon dioxide due to using a low amount of renewable energy and a high absorption rate, and because the salt production and phase separation do not occur, may eliminate the need to replenish the absorbent supply and maintain a normal level of the procedural efficiency.

Accordingly, when the present invention is applied to a process using a new absorbent for separating carbon dioxide from combustion exhaust gas at a low cost, it may greatly contribute to technologies for reducing greenhouse gases to deal with global warming.

Although the present invention has been described hereinabove, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A method for removing carbon dioxide comprising:
contacting a gas containing carbon dioxide with a carbon dioxide absorbent containing an added sterically hindered cyclic amine;
absorbing carbon dioxide from the gas; and
regenerating the carbon dioxide absorbent,
wherein the carbon dioxide absorbent includes 16 or less wt % of potassium carbonate (K$_2$CO$_3$) and 10 or less wt % of a sterically hindered cyclic amine; and
wherein the sterically hindered cyclic amine has a boiling point of 145° C. or more and a solubility of 500 grains/liter (g/l) or more in water at 25° C.

2. The method of claim 1, wherein the sterically hindered cyclic amine is at least one selected from a group consisting of 1-amino-4methyl piperazine, 1-(2-aminoethyl)-4methyl piperazine, 1-(2-hydroxyethyl)-4methyl piperazine, 1-(2-aminoethyl)-piperazine, 1-(2-hydroxyethyl)-piperazine, 2-aminoethyl-piperazine, 1-ethyl-piperazine, 2,5-dimethyl-piperazine, cis 2,6-dimethyl-piperazine, 1,4-dimethyl-piperazine, trans 2,5-dimethyl-piperazine, 1-methyl piperazine, 2-methyl piperazine, 1-ethyl piperazine, 2-piperidine ethanol, 3-piperidine ethanol, 4-piperidine ethanol, 2-aminoethyl-1-piperidine, and homopiperazine.

3. The method of claim 2, wherein the carbon dioxide absorbent further includes a corrosion inhibitor, a flocculation aid, an antioxidant, an antifoaming agent, or mixtures thereof.

4. The method of claim 2, wherein the absorbing of carbon dioxide is performed in the pressure range between 1 to 30 atmosphere and the temperature range between 20 to 90° C.

5. The method of claim 2, wherein the regenerating of the carbon dioxide absorbent is performed in the pressure range of 1 to 10 atmospheres (atm) and the temperature range of 105 to 120° C.

* * * * *